United States Patent [19]
Gibson

[11] Patent Number: 5,512,076
[45] Date of Patent: Apr. 30, 1996

[54] FILTER APPARATUS

[76] Inventor: Glenville Gibson, 88 Derwent Avenue, Allestres, Derby DE22 2DO, England

[21] Appl. No.: 307,189

[22] Filed: Sep. 16, 1994

Related U.S. Application Data

[63] Continuation-in-part of Ser. No. 961,933, filed as PCT/GB91/01169 Jul. 15, 1991, abandoned.

[30] Foreign Application Priority Data

Jul. 14, 1990 [GB] United Kingdom ................. 9015532

[51] Int. Cl.$^6$ ................................................. B01D 46/00
[52] U.S. Cl. ................................. 55/498; 55/522; 55/302
[58] Field of Search ................................ 55/302, 497, 498, 55/521, 522

[56] References Cited

U.S. PATENT DOCUMENTS

| | | | |
|---|---|---|---|
| 3,617,149 | 11/1971 | Gibson | 55/498 |
| 3,716,436 | 2/1973 | Pall et al. . | |
| 3,807,150 | 4/1974 | Maracle . | |
| 3,828,529 | 8/1974 | Frey et al. | 55/498 |
| 3,961,924 | 6/1976 | Alskog . | |
| 4,114,794 | 9/1978 | Storms | 55/498 |
| 4,290,889 | 9/1981 | Erickson . | |
| 4,695,300 | 9/1987 | Takagi . | |
| 5,320,096 | 6/1994 | Hans | 55/498 |

FOREIGN PATENT DOCUMENTS

| | | | |
|---|---|---|---|
| 652561 | 10/1937 | Germany | 55/521 |
| 890158 | 8/1953 | Germany | 55/521 |
| 1607713 | 9/1969 | Germany | 55/302 |
| 630886 | 12/1961 | Italy | 55/498 |
| 602157 | 6/1976 | Switzerland . | |
| 1130380 | 12/1984 | U.S.S.R. | 55/498 |
| 781194 | 8/1957 | United Kingdom | 55/521 |
| 893601 | 4/1962 | United Kingdom . | |
| 1426173 | 2/1976 | United Kingdom . | |

OTHER PUBLICATIONS

Filtration & Separation/Jan./Feb. 1973 vol. 10, No. 1 Uplands Press Ltd.

*Primary Examiner*—C. Scott Bushey
*Attorney, Agent, or Firm*—W. Thad Adams, III

[57] ABSTRACT

A circular filter cartridge for air pollution control has a plurality of pleats 10 so arranged on fold lines as to define an inner end section 20 for each pleat on the periphery of a circle 22 of a first diameter, and outer sections 24 extending between adjacent pleats lying on the periphery of a further circle 26 of increased diameter. By providing flat surfaces, dust or other pollution does not build up at any particular point on the filter and also wear on the cartridge is reduced, leading to a more efficient and cost effective filter cartridge. Lower pressures of compressed air or liquid can also be used for cleaning.

5 Claims, 1 Drawing Sheet

FILTER APPARATUS

This application is a continuation-in-part application of U.S. Ser. No. 07/961,933 filed Jan. 13, 1993, now abandoned, which is a national stage application of International Application No. PCT/GB91/01169 filed Jul. 15, 1991.

This invention relates to filter apparatus and is particularly concerned with circular filter cartridges for use in air pollution control.

Circular filter cartridges which generally find use in industrial applications can be, for example, one meter in length and some 300 mm–400 mm in diameter. Heretofore the cartridges have been formed from a suitable filter material provided with pleats to enable the circular configuration to be achieved. The pleats are generally formed from folds in the material extending axially in use and in a zig-zag arrangement, thereby providing V-shaped grooves through which the polluted air passes. Such filter cartridges tend to cause acceleration of the foreign matter in the air into the point of the V causing a compacted build-up of the foreign matter as well as the normal build-up of foreign matter on the side walls of the V. The filter material is normally cleaned by a reverse pulse of compressed air or backwash of liquid, but difficulties are then encountered in moving the foreign matter compacted at the root of the V. Because of this inefficient cleaning there is restriction in the depth of pleat which can be used and it has been found that approximately 25% of the filter becomes inefficient after a short time.

A further problem with such pleats is that the apex of the V facing towards the flow of the polluted air has a tendency to wear away quickly due to the abrasive action of the foreign matter being carried by the air.

Other types of circular filter cartridges of relatively small size are suitable for use in, for example, air conditioning systems and clean rooms for computer systems and the like, i.e. applications in which heavy dust loadings of the air being filtered would not be expected. Such disposable filters can be used where reverse pulse cleaning is not anticipated. An example of such a filter is shown in U.S. Pat. No. 3,807,150. The pleats therein require to be supported by separators which substantially close the spacing between side sections of the pleats.

If reverse pulse cleaning were to be used in a filter of this type, the spaces formed between adjacent parts of the separators would create small pockets in which plugs of dust would inevitably form. Relatively high pressures of compressed air would then be needed to remove these dust plugs. Such a filter would have to be discarded after a relatively short period of time if used in an industrial application with heavy dust loading, because the pressure drop across the filter would become unacceptable due to plugging. The accumulated dust cake could not be released to fall from the filter under its own weight.

The reverse pulse cleaning would also be hampered by the separators as these would cause the dust cake to dissipate into dust again and the dust would then re-entrain onto the filter almost in a never ending cycle.

SUMMARY OF THE INVENTION

According to the present invention there is provided a circular filter for use in an industrial, polluted air control system, said filter having a predetermined axial length and including a filter material having a plurality of pleats, each of said pleats comprising first and second opposing side sections extending substantially radially and retained circularly spaced apart, a base section connected between first ends of the side sections and having a predetermined circular dimension defined by turning of the filter material about a pair of spaced support members on a circle location whereby to form a first pair of spaced fold lines, and an outer section radially spaced outwardly of the base section and connected between a second end of one of said side sections and a second end of the other of said side sections of an adjacent pleat, said outer section having a predetermined circular dimension defined by a second pair of spaced fold lines, an open-ended space defined in each pleat between said side sections and the base section, said open-ended space, radially outwardly from the circle location of the support members, being substantially totally unobstructed between said side sections and throughout the axial length of the filter, whereby a pulse of air directed through the filter in the opposite direction to the passage of polluted air can vibrate the filter material to enable pollutants collected on said side sections, the base sections and the outer sections to be released and fall through the axial length of the filter.

Preferably each second pair of spaced fold lines is defined by turning of the filter material about a further pair of spaced support rods.

The width of each base wall is preferably of sufficient dimension as to prevent build-up of foreign matter at the inner end of the pleat.

Preferably also the diameter of the circle of the outer sections is between 300 mm and 350 mm.

BRIEF DESCRIPTION OF THE DRAWINGS

An embodiment of the present invention will now be described by way of example only with reference to the accompanying drawings, in which.

DESCRIPTION OF THE PREFERRED EMBODIMENT

Figure 1:
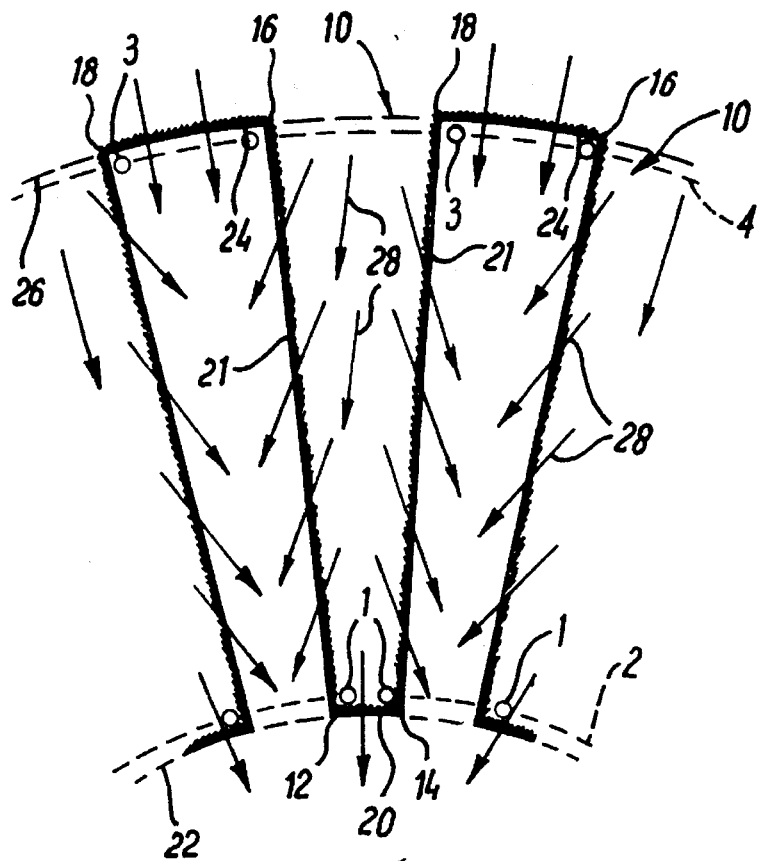
FIG. 1 is a diagrammatic section through part of a circular filter cartridge, showing the cartridge in use.
Figure 2:
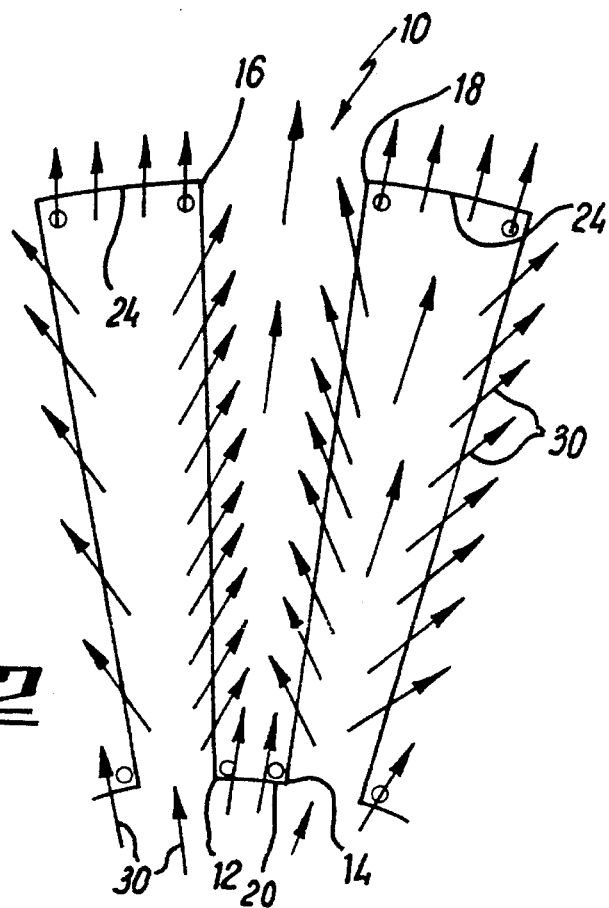
FIG. 2 is a similar diagrammatic view to FIG. 1 but showing the cartridge during cleaning.

A circular filter cartridge for air pollution control in an industrial application where there is often a heavy dust loading in the air, is formed of a suitable filter medium, for example needlefelt, extending between annular end flanges. The cartridge is generally used with its axis extending vertically.

Referring to the drawings, a first support arrangement for the filter material has the form of a plurality of wire rods 1 extending parallel to the filter axis between the end flanges, (not shown), and lying on the periphery of a circle 2 of a first diameter. The rods 1 are arranged in pairs which are circularly spaced apart, with the rods of each pair also being circularly spaced apart. A second support arrangement for the filter material comprises a plurality of further wire rods 3 also extending parallel to the filter axis between the end flanges, and lying on the periphery of a circle 4 of a diameter greater than the diameter of the first circle, the rods 3 again being provided in pairs which are circularly spaced apart and the rods of each pair also being circularly spaced apart. The pairs of rods 1 are offset relative to the pairs of rods 3. The opposite ends of each arrangement of rods 1, 3 are secured to a respective circular wire (not shown), subsequently embedded in the respective end flange during moulding of the latter.

The filter material is turned around the respective pairs of the rods 1, 3 whereby to form a plurality of pleats 10, each of which has a base section 20 defined by the folding of the filter material on lines 12, 14 around each pair of the rods 1, side sections 21 and an outer section 24 defined by folding of the filter material on line 16 around a respective one of the rods 3. Each outer section 24 connects the respective pleat 10 with the adjacent pleat by turning of the filter material around the other of the rods 3. The base sections 20 lie on the periphery of one circle 22, which the outer sections 24 lie on the periphery of a further circle 26 of increased diameter, for example between 300 mm and 350 mm.

In use, air is drawn through the filter in the direction of arrows 28, the filter material being restrained against radially inward movement by the rods 3 but being generally clear of the rods 1. The dust or other pollution in the air accumulates on outer surfaces of the outer sections 24, outer surfaces of the side sections 21, and outer surfaces of the base sections 20, but is distributed thereover and does not build up at any particular point. Further, wear on the cartridge is reduced as the polluted air engages with flat surfaces. These surfaces enable the dust or dirt in the air to fall easily away from the filter material, the released dust or dirt being able to move off the lower end flange of the cartridge.

When using a reverse pulse of compressed air or a backwash of liquid in the direction of arrows 30 for cleaning of the filter, the filter material is effectively subjected to a sharp vibration and is free to relax and move radially outwardly from the rods 3, while the rods 1 can have a restraining action if necessary. The reverse pulse or backwash penetrates through the base sections 20 as well as the side sections 21 and the outer sections 24 to give an overall cleaning action, the vibration releasing the dust or dirt. As an open ended space is defined in each pleat 10 between the side sections 21 and the base section 20, and the said space is substantially totally unobstructed outwardly of the circle 2 between the side sections 21 and throughout the axial length of the filter, when the dust cake becomes loose, it can fall off the filter under its own weight and through the axial length of the filter. Also pleats of increased depth can be used, enabling a greater amount of filter area to be used for the same cross-sectional area of filter. The filter cartridge becomes more efficient for its size and thus more cost effective. Lower pressure of compressed air or liquid can be utilised during cleaning.

In a modification, the filter material may be supported on the circle 26 by other than the rods 3. For example, at least those sections 24 of the filter material may be reinforced either integrally or by other means. In any of these modifications however, there remains a substantially totally unobstructed space between the side sections 21 of each pleat 10, with the space being substantially totally unobstructed throughout the axial length of the filter.

The end plates are generally of greater diameter than the filter material to provide for endwise connecting together of cartridges where an increased length of filter is required.

Various other modifications may be made without departing from the invention. For example the shapes of the pleats can differ from that described and shown provided build-up of foreign matter is prevented in the pleats. Further, whilst this specification describes a filter cartridge for use in air pollution control this invention could be used in the filtration of liquids.

I claim:

1. A circular filter for use in an industrial, polluted air control system, said filter having a predetermined axial length and including a filter material having a plurality of pleats, each of said pleats comprising first and second opposing side sections extending substantially radially and retained circularly spaced apart, a base section connected between first ends of the side sections and having a predetermined circular dimension defined by turning of the filter material about a pair of spaced support members on a circle location whereby to form a first pair of spaced fold lines, the filter material of the base section being unobstructed in the space between the pair of support members, and an outer section radially spaced outwardly of the base section and connected between a second end of one of said side sections and a second end of a side section of an adjacent pleat, said outer section having a predetermined circular dimension defined by a second pair of spaced fold lines, an open-ended space defined in each pleat between said side sections and the base section, whereby a pulse of air directed through the filter in the opposite direction to the passage of polluted air can vibrate the filter material to enable pollutants collected on said side sections, the base sections and the outer sections to be released and fall through the axial length of the filter.

2. A filter according to claim 1, wherein each second pair of spaced fold lines is defined by turning of the filter material about a further pair of spaced support members.

3. A filter according to claim 1 or 2, wherein the filter material is needlefelt.

4. A filter according to claim 1 or 2, wherein the width of each base section is of sufficient dimension as to prevent build-up of foreign matter at the inner end of the pleat.

5. A filter according to claim 1 or 2, wherein the diameter of the circle of the outer sections is between 300 mm and 350 mm.

\* \* \* \* \*